(12) United States Patent
Albrecht et al.

(10) Patent No.: US 7,523,660 B2
(45) Date of Patent: Apr. 28, 2009

(54) OVAL GEAR METER

(75) Inventors: Rudolf Albrecht, Bad Aibling (DE); Albert Haberlander, Traunstein (DE); Karl Helminger, Ainring (DE)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 11/916,785

(22) PCT Filed: Jun. 8, 2005

(86) PCT No.: PCT/EP2005/006153

§ 371 (c)(1),
(2), (4) Date: Dec. 19, 2007

(87) PCT Pub. No.: WO2006/131134

PCT Pub. Date: Dec. 14, 2006

(65) Prior Publication Data

US 2008/0202255 A1      Aug. 28, 2008

(51) Int. Cl.
*G01F 3/04* (2006.01)
(52) U.S. Cl. .................................................. 73/261
(58) Field of Classification Search ............ 73/261, 73/861.77, 861.79; 418/206.5, 206.2
See application file for complete search history.

(56) References Cited

U.S. PATENT DOCUMENTS

| | | | | |
|---|---|---|---|---|
| 4,224,015 A | * | 9/1980 | Nagata ..................... | 418/150 |
| 4,579,008 A | * | 4/1986 | Bohm et al. ............... | 73/861.78 |
| 5,323,651 A | * | 6/1994 | Krampitz et al. ........... | 73/261 |
| 5,992,230 A | * | 11/1999 | Scarpa et al. ............. | 73/261 |
| 5,996,405 A | * | 12/1999 | Bergervoet et al. ........ | 73/261 |
| 6,644,947 B2 | * | 11/2003 | Cavanaugh ............... | 418/206.5 |

FOREIGN PATENT DOCUMENTS

| | | |
|---|---|---|
| EP | 1471337 | 4/2004 |
| EP | 1493988 | 6/2004 |
| FR | 2842913 | 7/2002 |
| JP | 62269014 | 11/1987 |
| JP | 63095321 | 4/1988 |
| WO | WO0163221 | 8/2001 |
| WO | WO0233364 | 4/2002 |
| WO | WO2005119184 | 12/2005 |

* cited by examiner

*Primary Examiner*—Jewel Thompson
(74) *Attorney, Agent, or Firm*—Fredrikson & Byron, PA

(57) ABSTRACT

The invention relates on an oval gear meter for volume flow measurement comprising a housing with an oval gear chamber with a fluid inlet and a fluid outlet, a pair of oval gear wheels positioned in the chamber and together forming an intermeshing or non-intermeshing involute toothing, and a contactless magneto-reactive sensor means positioned outside of the chamber. At least one of the oval gear wheels is provided with at least one permanent magnet to form a trigger wheel. The sensor means is positioned in an appropriate position relative to the trigger wheel so that the sensor means is adapted to measure the rotation of the oval gear wheels by measuring the rotation of the trigger wheel. The trigger wheel is provided with a permanent magnet that generates a generally homogeneous magnetic field along one axis of symmetry of the trigger wheel so that the magnetic field is generally symmetrical relative to the rotational axis of the trigger wheel. The sensor means is designed as a GMR-spin valve sensor means and is positioned generally concentrically relative to the rotational axis of the trigger wheel.

10 Claims, 3 Drawing Sheets

Figure 3:
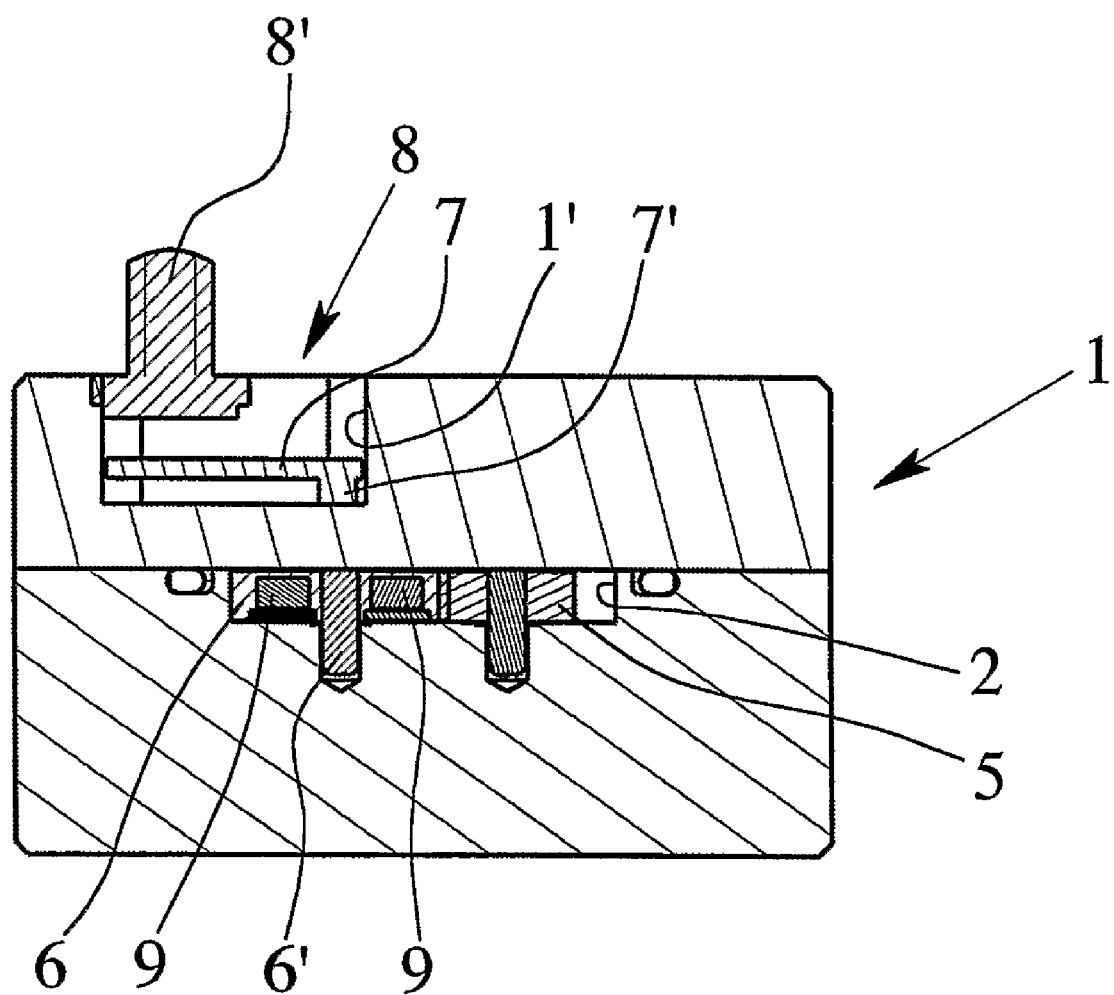

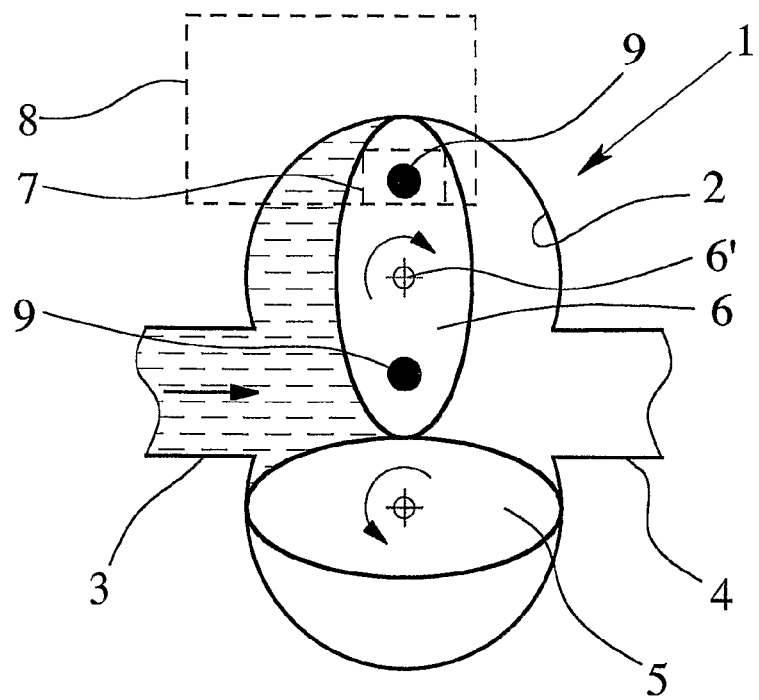
PRIOR ART Fig. 1
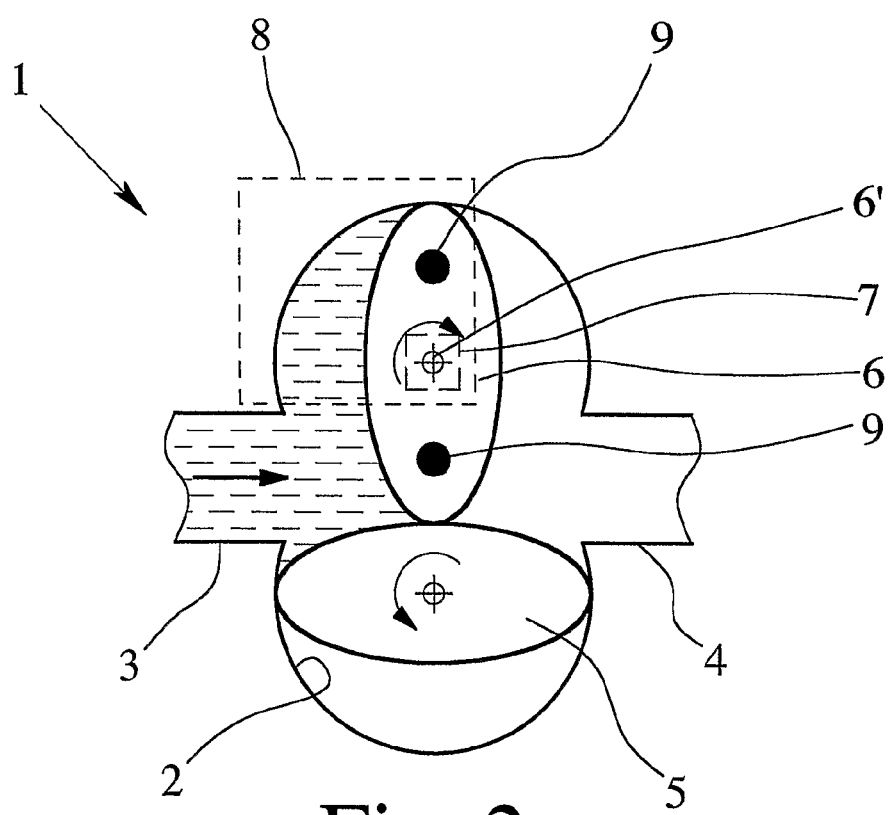
Fig. 2

OVAL GEAR METER

The present invention relates to an oval gear meter for volume flow measurement.

The term fluid is used herein to identify any continuous substance that is tending to flow or conform to the outline of its container. So the term fluid encompasses liquids and gases. A particularly interesting application of the present invention is for liquids, in particular liquid products and chemicals used in cleaning, washing, disinfecting, rinsing or the like.

The volume flow of a fluid can be measured by a positive displacement flow meter. A very common, precise positive displacement flow meter is an oval gear meter (U.S. Pat. No. 5,992,230 A). An oval gear meter comprises a housing that forms an oval gear chamber with a fluid inlet and a fluid outlet. A pair of oval gear wheels is positioned in the chamber so that each can rotate about its specific rotational axis in a way that the two oval gear wheels provide an involute toothing.

As explained as prior art in U.S. Pat. No. 5,992,230 A a traditional oval gear meter provides a pair of toothed oval gear wheels that are positioned relative to one another in the oval gear chamber such that the gear teeth disposed on their surfaces mesh together at the point of atriculation and remain as such during an entire rotation cycle. Ideally none of the fluid being metered actually passes directly between the oval gear wheels themselves. The intermeshing wheels in combination with the inherent viscosity of the fluid being metered is intended to prevent the flow of fluid between the two articulating wheel surfaces. The metered fluid is swept out in the precisely measured pockets created by the oval shape of the oval gear wheel and the inner chamber wall as the oval gear wheels rotate about their respective rotational axes.

The above explained traditional construction is widely used. The prior art that forms the starting point of the invention, however, provides a modified construction of an oval gear meter with a pair of non-intermeshing, spaced apart, smooth surface oval gear wheels within the oval gear chamber. Those two oval gear wheels within the oval gear chamber are interconnected by a pair of intermeshing timing gears that are disposed outside of the oval gear chamber.

The above explained prior art oval gear meter is preferably used with a liquid as working fluid, and more particularly with a liquid of higher relative viscosity. The reason is that the oval gear wheels are spaced apart as well as from the inner walls of the oval gear chamber such that the liquid itself forms a liquid seal at all gaps and thus the working fluid is prevented from flowing through those gaps. This type of oval gear meter with an involute toothing provided without intermeshing contact between the oval gear wheels is said to reduce wear and tear of the metering system. Ideally in this construction the two oval gear wheels should move on rolling contact with practically no sliding friction therebetween. However, manufacturing tolerance and temperature influence prevents this ideal situation and demands either a true intermeshing pair of oval gear wheels or acceptance of minimal gaps between the oval gear wheels that are sealed by the working fluid, in particular the working liquid itself.

The volume flow through an oval gear meter is measured indirectly by measuring the rotational speed of the oval gear wheels. For measuring the rotational speed of the oval gear wheels frequently a contactless magneto-reactive sensor means with one or two hall sensors is used. This sensor means is positioned outside the oval gear chamber either in a separate compartment of the housing or in a separate housing attached to the oval gear meter housing. Of course, the housing walls must be from a material like plastics that is not inhibiting the measurement by the magneto-reactive sensor means.

The sensor means is assigned to at least one of the two oval gear wheels. This specific wheel is provided with normally two permanent magnets positioned separate from each other at a distance along the longitudinal axis of this oval gear wheel which thus is the trigger wheel. The two permanent magnets are parallel poled so that each one forms its own magnetic field. By means of one HALL sensor in the sensor means it is possible to measure the rotation of the oval gear wheels by truly counting the revolutions of the trigger wheel. With two HALL sensors next to each other it is possible to identify the direction of rotation.

Another way to measure the rotational speed of the oval gear wheels uses inductive proximity switches which are triggered by ferromagnetic indicator means positioned in one of the oval gear wheels. The oval gear wheels themselves are made from non-ferromagnetic material. This kind of sensor means operates very similar to above explained HALL sensor means.

The prior art which was mentioned above (U.S. Pat. No. 5,992,230 A) provides a pair of intermeshing timing gears outside the oval gear chamber. This specific construction which of course has the disadvantage that the cover of the oval gear chamber needs a pair of spaced apart shaft apertures for the shafts coupling the oval gear wheels to the timing gears, however has the advantage that a specific high resolution flow sensor mechanism may be used. Here a magnetic star type gear is additionally secured to the shaft coupling the oval gear wheel with the timing gear that here forms the trigger wheel. The magnetic star gear is comprised of a series of twelve non-uniformly spaced magnetic radials. Thus, as this gear rotates through a complete cycle, each of the twelve associated magnetic radials will pass within close proximity of and be detected by a conventional magnetic sensor/counter. One complete rotation of the magnetic star gear will thus result in twelve detections/impulses by the sensor/counter. The non-uniform spacing of the magnetic radials accommodates the relatively non-uniform rotation rate of the shaft, i.e. the trigger wheel, i.e. the coupled oval gear wheel. This leads to a more uniformly spaced series of detection events. A simple calibration, performed by an external logic controller or evaluation electronics, perhaps by a programmable logic control, can map each detection event as recorded by the sensor/counter to a known quantity or volume of fluid, and present this information in a digital format as output for further processing by associated equipment.

The prior art mentioned above explains that in addition to the magnetic actuating and sensing means specifically described therein a variety of other commonly employed actuator/sensor technologies are also available which can effectively and efficiently perform the same function. In particular this prior art mentions optical encoders.

The above given extensive explanation of prior art reveals that all presently available oval gear meters and their sensing/counting systems have specific downsides.

The resolution of the magneto-reactive sensor means or inductive proximity sensor means for a sealed oval gear chamber where no magnetic star type gear can be used, is too low for a true real-time control or for measurement of low flow rates. As the precision of fluid pumps increases in particular for low flow rates, measuring the volume flow should follow this development.

Use of a magnetic star type gear to increase resolution of the measuring system needs a non-sealed oval gear chamber and still is insufficient for high precision fluid pumps and very low flow rates.

Optical encoders are insufficient in particular for the preferred field of application in cleaning, washing, disinfecting or the like, because of problematic ambient conditions, chemical attack, pressure conditions etc.

Altogether it is an object of the present invention to develop an oval gear meter for volume flow measurement with a substantially increased resolution of the measuring system.

The present invention meets above mentioned object with an oval gear meter for volume flow measurement with the features of the introductory part of claim 1 and providing the further features of the characterizing part of claim 1.

In general the present invention can be used with an oval gear meter with a non-sealed oval gear chamber and timing gears outside thereof. However, it is preferred and provides particular advantages that this invention is used with a sealed oval gear chamber with just the oval gear wheels and no timing gears. The oval gear wheels may be literally intermeshing or may be running with small, tolerance-defined gaps between smooth surfaces.

First of all it is important that the trigger wheel is provided with a magnetic system that generates a generally homogeneous magnetic field along one axis of symmetry of the trigger wheel, preferably the major axis of the trigger wheel. In the traditional prior art oval gear meter with magneto-reactive sensor means the magnetic field of the permanent magnet is oriented perpendicular to the middle plane of trigger wheel. In contrast to this the orientation of the magnetic field according to the invention is more or less parallel to the middle plane of the trigger wheel. This generally homogenous magnetic field is therefore generally symmetrical relative to the rotational axis of the trigger wheel. This generally homogeneous magnetic field is thus rotating in substantially the same way as the trigger wheel does.

The continuously rotating magnetic field is monitored by a specific magneto-reactive sensor means. There is no counting done but a true monitoring of this rotation.

The special position of the magnetic field is monitored by a sensor means that has a high resolution. This is a GMR-spin valve sensor means. The basic physics of a GMR-spin valve sensor means which is based on the GMR effect (giant magneto resistance effect) is explained in the IBM research publication for GMR at http://www.research.ibm.com/research/gmr.html. A GMR-spin valve sensor element contains two magnetic layer. A pinned or fixed direction layer is combined with a free or movable direction layer. The movable layer aligns with the field lines of the applied magnetic field. The angle between the fixed direction layer and the movable direction layer determines the electrical resistance of this sensor element.

In practice a saturating magnetic field should be applied in the plane of the sensor in order for this sensor element to operate properly. The movable direction layer will align with the applied magnetic field. As the applied magnetic field changes its direction, the angle between the movable direction layer and the fixed direction layer changes accordingly. This results in a corresponding change of the resistance of this element.

Positioning of the GMR-spin valve sensor means relative to the permanent magnet of the trigger wheel is important. It should be positioned generally concentrically relative to the rotational axis of the trigger wheel which is considered to be the rotational axis of the generally homogeneous magnetic field generated by the permanent magnet. "Generally concentrically" here is not meant in a strict geometrical sense but means an orientation of the sensor means that leads to the correct analog monitoring of the rotating magnetic field mentioned above.

The advantage of a GMR-spin valve sensor means versus a HALL-sensor means lies in the fact that it provides a sine output signal following the rotation of the homogeneous magnetic field provided by the permanent magnet means of the trigger wheel.

A single GMR-sensor element is generally sufficient to monitor the rotation of the trigger wheel. However, precision of the measurement as well as variety of output signals increases with a more sophisticated GMR-sensor means. Insofar it is a preferred embodiment where the GMR-sensor means is designed as a GMR-spin valve bridge sensor with two or, preferably, four GMR-spin valve sensor elements at 90° positions in two half-bridges. Such a GMR spin valve bridge sensor is available e.g. from NVE corporation with identification No. NVE AAV 001-11 and AAV 002-11.

A GMR-spin valve bridge sensor provides four GMR resistors, rotated at 90° intervals in one package. Here the meaning of "generally concentrically" indeed has a geometrical content, too. The output of those four offset resistors can be configured to represent the sine function and the cosine function of the magnetic field that is applied to the complete sensor. Each sensor element contains two magnetic layers. A pinned, fixed direction layer and a free, movable direction layer. The generally homogeneous magnetic field of the trigger wheel must be strong enough to be a saturating magnetic field for the sensor elements. In the example mentioned here this is 30 to 200 Oersted. Using the sine output and the cosine-output of the two half-bridges gives an absolute position of the trigger wheel, because each position is represented by a different combination of the sine amplitude and the cosine amplitude. The frequency of the signals changes with the rotational speed of the trigger wheel.

It depends on the voltage applied as well as on the further capabilities of the evaluation electronics how high the resolution of the GMR-sensor means is. Depending on the specifics of analog/digital-conversion one may achieve a resolution of 1.5°/imp up to even 0.4°/imp. This means on the other hand impulse-rates of more than 200 imp/rev up to 1000 imp/rev.

Recently there has been proposed a magnetic sensing system based on four HALL-sensor elements positioned at 90° angles and connected in two half-bridges in order to increase the resolution of a shaft encoder in general (publication "iC-MA HALL-WINKELSENSOR/-ENCODER" of iC-Haus GmbH, published in May 2005 on www.ichaus.com). This is a generally applicable contactless magneto-reactive sensor means which together with a diametrically magnetized, cylindrical permanent magnet forms a complete shaft encoder. The orientation of the magnetic field at the sensor means has to be perpendicular to the middle plane of the rotating permanent magnet. The distance of the sensor chip from the permanent magnet has to be very small. This system is good for a shaft encoder where a small distance can be easily realized.

The evaluation electronics for this prior art general sensor system for shaft encoders uses the advantages of two half-bridges for cosine- and sine-functions (see above mentioned prior art document). This working principle of the evaluation electronics may be applied for the present GMR-spin valve sensor means as well.

Now, more details may be obtained from the features of the dependent claims as well of the description of a preferred embodiment of the invention described with reference to the attached drawings.

In the drawings

Figure 4:
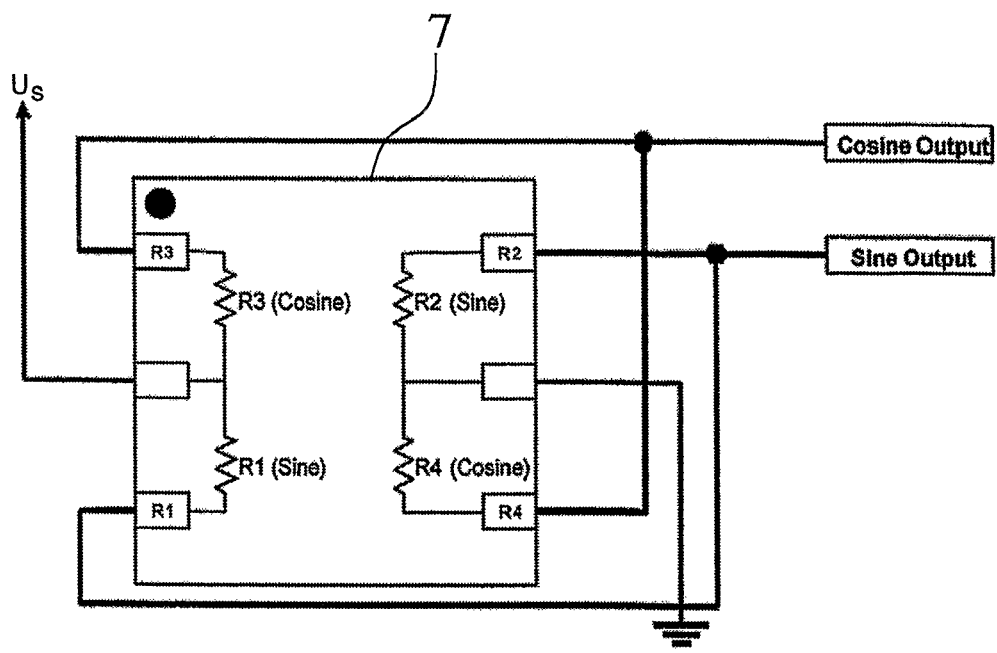
Figure 5:
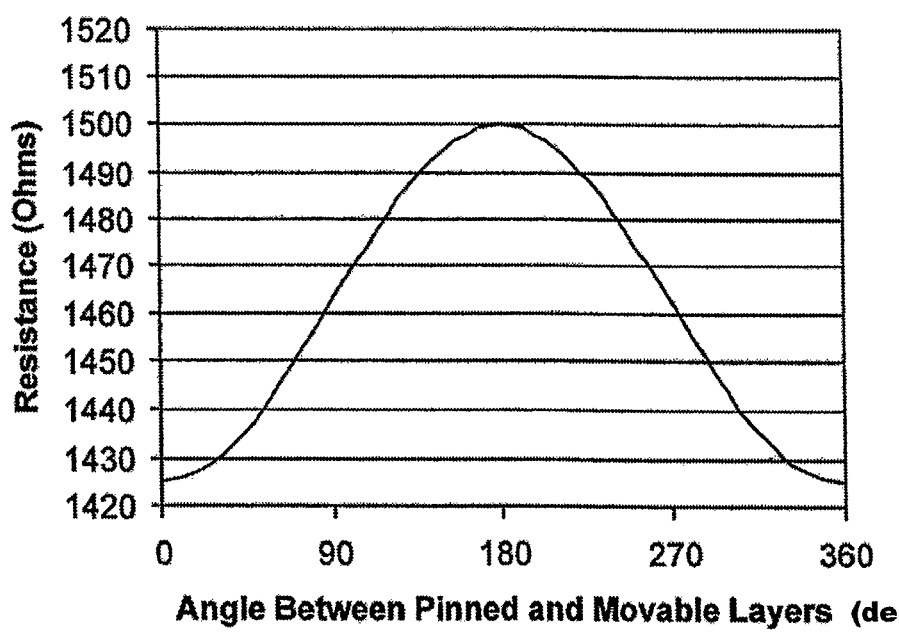

FIG. 1. shows the principle of an oval gear meter with a prior art sensor means, FIG. 2 shows a schematic view of an oval gear meter according to the invention with the positions of permanent magnets and sensor means, FIG. 3 shows a vertical section through a practical embodiment of the invention, FIG. 4 shows a schematic circuitry of a GMR spin valve bridge sensor FIG. 5 shows a diagram of the resistance change of a spin valve sensor element with orientation of the external magnetic field.

FIG. 1 shows the general principle of an oval gear meter for volume flow measurement. FIG. 1 shows a housing 1 with an oval gear chamber 2. The housing 1 should be of a material that will not inhibit measurement of magnetic fields generated within the housing 1. Preferably the housing 1 should be from a sufficiently rigid plastics material.

The housing 1 comprises a fluid inlet 3 to the oval gear chamber 2 and a fluid outlet 4 from the oval gear chamber 2. Two oval gear wheels 5, 6 are positioned in the oval gear chamber 2 and are forming an involute toothing with each other. So this type of volume flow meter is very precise from a mechanical point of view.

As explained at length in the introductory part of the description with reference to the prior art, in particular of U.S. Pat. No. 5,992,230 A, this prior art being used as supplementary disclosure to the present patent application, the pair of oval gear wheels 5, 6 in the chamber 2 may form an intermeshing involute toothing or may be provided with smooth surfaces and thus form a non-intermeshing involute toothing where the fluid that is being metered forms, seals between the rotating surfaces of the oval gear wheels 5, 6 as well as between the oval gear wheels 5, 6 and the wall of the oval gear chamber 2. Moreover, where the oval gear wheels 5, 6 together form a non-intermeshing involute toothing there may be additionally provided a pair of generally oval intermeshing timing gears positioned outside of the oval gear chamber 2 but coupled to the oval gears wheels 5, 6 within the chamber 2. As explained in the introductory part of the description it depends on the specific construction and application which version of an oval gear meter is used.

The present invention is intended to be used with all kinds of fluids, but preferably with liquids and preferably in the field of liquid products and chemicals used for cleaning, washing, disinfecting, rinsing or the like.

Measurement of the volume flow is provided by measurement of the rotation of the oval gear wheels 5, 6. In this regard this system comprises a contactless magneto-reactive sensor means 7 (FIG. 2) positioned outside of the chamber 2. In this preferred embodiment the chamber 2 may be sealed (apart from the fluid inlet 3 and fluid outlet 4). In the present embodiment, an evaluation electronics 8 for evaluating the signals of the sensor means 7 is provided, too.

In the present embodiment of the invention one of the oval gear wheels 6, 7, namely the oval gear wheel 6, is provided with at least one permanent magnet 9 and thus forms a trigger wheel. In a system with a non-sealed oval gear chamber 2 an external timing gear may be provided with this permanent magnet and then is the trigger wheel.

The sensor means 7 is positioned in an appropriate position relative to the trigger wheel 6 so that the sensor means 7 is adapted to measure the rotation of the oval gear wheels 5, 6 by measuring the rotation of the trigger wheel 6.

As explained before in the introductory part of the description, in prior art oval gear meters the magneto-reactive sensor means 7 is provided with mostly two HALL-sensor elements that are counting the revolutions of the trigger wheel 6. The trigger wheel 6 there is equipped with two small, cylindrical permanent magnets 9 positioned at a distance along the major axis of the trigger wheel 6. In the prior art system the permanent magnets 9 are poled in parallel as explained in the introductory part of the description.

FIG. 1 shows that the sensor means 7 indicated in dashed lines there is offset relative to the axis 6' of the trigger wheel 6, because the passing of the permanent magnet 9 past the HALL-sensor is relevant. In this system a counting of the impulses generated by the passing permanent magnets 9 takes place.

In contrast to this in the inventive system the GMR sensor means 7 is positioned in a nearly full overlap with the trigger wheel 6, because the rotating generally homogeneous magnetic field shall be continuously monitored in its angular position by the GMR sensor (see FIG. 2).

In this embodiment the permanent magnet 9 generates a generally homogeneous magnetic field along the major axis of the trigger wheel 6. The magnetic field is generally symmetrical relative to the rotational axis 6' of the trigger wheel 6. As already said it is basically possible to have an orientation along the minor axis of the trigger wheel 6, but then the resolution or evaluation may be somewhat impaired. In general it is just important that the magnetic field extends along any axis that intersects with the rotational axis 6' of the trigger wheel 6. It is important that the magnetic field rotates about the rotational axis 6' of the trigger wheel 6 more or less in the same way as the trigger wheel 6 itself does.

For the use of a GMR-sensor means 7 it is, as already explained, necessary to generate a generally homogeneous magnetic field in the plane of the sensor means 7. The strength of the magnetic field should be close to the saturating level of the sensor means 7 to eliminate errors by fluctuations of the magnetic field. In the embodiment explained above it would be between 30 and 200 Oersted. The generally homogeneous magnetic field which is generally symmetrical relative to the rotational axis 6' of the trigger wheel 6 and is extending along an axis of the trigger wheel 6 (parallel to the plane defined by the trigger wheel 6 itself) may be generated by a radial permanent magnet. A radial oriented permanent magnet is not only expensive but needs a large recess in the trigger wheel 6.

So it is a preference of the present embodiment to use the traditional two separate, preferably cylindrical permanent magnets 9 that are positioned at a distance along an axis of the trigger wheel 6. Those are oppositely poled to generate the intended homogeneous magnetic field along this axis. The two permanent magnets 9 are positioned with their N-S-axis generally orthogonal to the plane of the trigger wheel 6.

It is preferred to position the permanent magnets 9, oppositely poled, along the major axis of the trigger wheel 6. The distance of the permanent magnets 9 depends on the strength of the magnetic field that is needed for reliable operation of the GMR-sensor means 7. Further, the distance of the GMR-sensor means 7 from the plane defined by the trigger wheel 6 is additionally an important factor for the layout of this oval gear meter.

In the present embodiment which may be considered the best mode to practice the invention the length of the trigger wheel 6 along the major axis is about 17 mm, 22 mm or 35 mm, the size of each permanent magnet 9 (diameter) is about 4 mm, and the distance of the two permanent magnets 9 is about 9 mm, 12 mm or 18 mm.

In the present and preferred embodiment the GMR-sensor means 7 comprises not 15 only a single GMR-spin valve element but a full GMR-spin valve bridge sensor with four GMR resistors in one package, each resistor positioned at a 90° angle relative to the neighboring resistors (FIG. 4). In detail please refer to the data sheet of the initially mentioned NVE-spin valve GMR bridge sensors AAV 001-11, AAV 002-11.

FIG. 3 shows a vertical section through a preferred embodiment of the invention. The chip 7' of the GMR-sensor means 7 carrying the complete GMR-spin valve bridge sensor with four GMR-spin valve sensor elements (claim 6) is positioned exactly above the rotational axis 6' of the trigger wheel 6. The complete sensor means 7 with its evaluation electronics 8 and an interface 8' is positioned within a corresponding chamber 1' of the upper part of the housing 1.

The voltage at the sine-output (FIG. 4) at "0" is $U_s/2$ and at the cosine-output (FIG. 4) it is $U_s/2+U_{max}$ ($U_s$=supply voltage; $U_{max}$=maximum output voltage.) FIG. 5 shows the graph of the device resistance vs. the angle between the pinned layer and the movable layer in a GMR-sensor element.

In order to achieve the largest signal variation within the possible values defined by $U_s$ the signal is amplified to have only a small gap of 0,1 V from the highest and the lowest value each. With a maximum value of 4,096 V the voltage range may then be 3,896 V. With an 8-bit A/D-transducer the resolution is:

3,896 V/4,096 V*255=242 steps/rev–about 1,5° per step.

If a 10-bit A/D-transducer is used the resolution is:

3,896 V/4,096 V*1024=974 steps/rev–about 0,37° per step.

In the present embodiment the intended signal amplitude of the sine-signal and the cosine-signal is achieved by an appropriately modified amplification. As mentioned above an automatic control as in the prior art of iC-Haus would be useful for the present purpose, as well.

The sine and cosine signals may be digitized in a table so that they may be used in a table look up procedure. Thus for each digital value of those two signals a single angle position of the trigger wheel 6 is assigned. The direction of rotation can be obtained from a comparison of two immediately following angle values. The specific problem of 360°/0° has to be considered appropriately.

The use of a GMR-spin valve bridge sensor with four GMR resistors arranged in two half-bridges further provides for full temperature compensation relative to the zero point.

The size of the oval gears wheels 5, 6 and the oval gear chamber 2 defines a particular volume for each revolution of the oval gear wheels 5, 6. According to this specific volume each angle value or step will be representing a specific volume. This is the calibration of the oval gear meter. A specific impulse sequence is representative for a specific volume flow. The output signal of the evaluation electronics 8 may be ml/imp.

The evaluation electronics together 8 with the inventive GMR spin valve sensor means 7 allows for correction of negative impulses. This is necessary to eliminate pulses resulting from oscillations in the conduit system. In this regard the direction of the rotation must be measured and considered by the evaluation electronics 8.

The system is particularly advantageous if combined with a corresponding fluid (in particular: liquid) pump. The pump may communicate with the evaluation electronics e.g. through a bus-system. The oval gear meter identifies itself at the beginning with an identification code containing all necessary data for identification of this specific oval gear meter as well as all calibration data.

In normal operation the central control unit or the control unit of the pump means receives from the oval gear meter or its evaluation electronics the maximum number of impulses per revolution. Impulses generated in the correct direction of flow are counted and impulses in the opposite direction are discounted. The angular positions for the relative sine and cosine outputs are stored in the memory means and can be electronically looked up in this table.

In general the software must allow calibration of the oval gear meter in situ as well as manual input of a specific volume. All this can be programmed by the operator without restrictions. It is normally a programmable logic control that enables all this for normal applications. The pumping systems used will mostly employ electrically driven pump means with a sophisticated control interface.

The present invention relies on a GMR spin valve sensor means for the oval gear meter. The GMR sensor means has proven to be manufactured reliably and economically, and to yield uniform measurement outputs over the complete lifetime in a stable, neither corroding nor degrading manner.

The invention claimed is:

1. An oval gear meter for volume flow measurement comprising:
   a housing including an oval gear chamber, the chamber including a fluid inlet and a fluid outlet;
   a pair of oval gear wheels positioned in the chamber and together rotating in response to volume flow through the chamber;
   at least one permanent magnet coupled to a first of the pair of oval gear wheels and rotating therewith, the at least one permanent magnet generating a generally homogeneous magnetic field that extends along an axis of symmetry of the first oval gear wheel, the magnetic field rotating about, and being generally symmetrical relative to, a rotational axis of the first oval gear wheel; and
   a contactless magneto-reactive sensor means for monitoring the magnetic field, the sensor means being positioned outside of the chamber, approximately aligned with the rotational axis of the first oval gear wheel, and the sensor means including a GMR-spin valve sensor.

2. The oval gear meter according to claim 1, wherein the at least one permanent magnet comprises a single radial permanent magnet.

3. The oval gear meter according to claim 1, wherein the at least one permanent magnet comprises two separate, oppositely poled, permanent magnets positioned at a distance along the axis of symmetry of the first oval gear wheel.

4. The oval gear meter according to claim 3, wherein the length of the the axis of symmetry of the first oval gear wheel is about 17 mm, the size of each permanent magnet (diameter) is about 4 mm, and the distance along the axis of symmetry is about 9 mm.

5. The oval gear meter according to claim 1, wherein the strength of the magnetic field, generated by the at least one permanent magnet, is close to a saturating level of the GMR-spin valve sensor.

6. The oval gear meter according to claim 1, wherein the GMR-spin valve sensor is one of at least two GMR-spin valve sensor elements at 90° positions in two half-bridges of a GMR-spin valve bridge sensor.

7. The oval gear meter according to claim 1, further comprising evaluation electronics for evaluating output signals of the sensor means, the electronics including a memory to store a table assigning each specific value of the output signals to a specific angular position of the first oval gear wheel.

8. The oval gear meter of claim 1, wherein the volume flow is of a liquid selected from the group consisting of: liquids used for cleaning, washing, disinfecting, rinsing, and mixtures thereof.

9. The oval gear meter of claim 1, wherein the at least one permanent magnet is directly coupled to the first oval gear wheel.

10. The oval gear meter of claim 1, farther comprising a timing gear being coupled to the first oval gear wheel and positioned outside the chamber; and wherein the at least one permanent magnet is directly coupled to the timing gear.

* * * * *